[19] United States Patent
Kruspe

(10) Patent No.: US 10,145,210 B2
(45) Date of Patent: Dec. 4, 2018

(54) HYBRID BATTERY FOR HIGH TEMPERATURE APPLICATIONS

(71) Applicant: BAKER HUGHES INCORPORATED, Houston, TX (US)

(72) Inventor: Thomas Kruspe, Niedersachsen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 593 days.

(21) Appl. No.: 13/921,781

(22) Filed: Jun. 19, 2013

(65) Prior Publication Data

US 2014/0374088 A1    Dec. 25, 2014

(51) Int. Cl.
*E21B 41/00* (2006.01)
*G01V 11/00* (2006.01)

(52) U.S. Cl.
CPC .......... *E21B 41/00* (2013.01); *E21B 41/0085* (2013.01); *G01V 11/002* (2013.01)

(58) Field of Classification Search
CPC ................ E21B 41/0085; E21B 47/00; H01M 2/10–2/1077; H01M 2/1088; H01M 10/425; H01M 10/6235; H01M 10/627; H01M 16/00–16/0006; H01M 2220/00–2220/10; H01M 2250/00; H01M 2250/10; H01M 2250/40
USPC ........................................................ 166/65.1
See application file for complete search history.

(56) References Cited

U.S. PATENT DOCUMENTS

| | | | |
|---|---|---|---|
| 4,416,000 A * | 11/1983 | Scherbatskoy | E21B 41/0085 367/81 |
| 5,878,824 A | 3/1999 | Mercer et al. | |
| 6,845,819 B2 | 1/2005 | Barrett et al. | |
| 7,667,942 B2 * | 2/2010 | Boling | H02J 7/0031 361/103 |
| 7,699,102 B2 | 4/2010 | Storm et al. | |
| 7,717,167 B2 | 5/2010 | Storm et al. | |
| 8,058,846 B2 | 11/2011 | Kim | |
| 8,102,142 B2 | 1/2012 | Smith et al. | |
| 8,220,545 B2 | 7/2012 | Storm et al. | |
| 2002/0015871 A1 | 2/2002 | Tao et al. | |
| 2004/0081865 A1 | 4/2004 | Zhang et al. | |
| 2005/0211436 A1 | 9/2005 | Fripp et al. | |
| 2007/0212596 A1 | 9/2007 | Nebrigic et al. | |
| 2011/0144861 A1 | 6/2011 | Lakirovich et al. | |
| 2012/0156528 A1 * | 6/2012 | Cooley | H01M 16/00 429/9 |

(Continued)

FOREIGN PATENT DOCUMENTS

EP    0269767 A1 *  6/1988 ............... H02J 7/34

OTHER PUBLICATIONS

PCT/US2014/042044—International Search Report dated Oct. 13, 2014.
EP Application No. 14813947.0—Supplementary Search Report.

*Primary Examiner* — D. Andrews
*Assistant Examiner* — Tara E Schimpf
(74) *Attorney, Agent, or Firm* — Mossman, Kumar & Tyler, PC

(57) ABSTRACT

An apparatus for supplying power at the surface and in a wellbore may include a downhole tool conveyed into the wellbore and a battery bank conveyed by the downhole tool. The battery bank may include a plurality of battery cells, wherein at least two cells of the plurality of battery cells have substantially different power responses to a change in an ambient temperature at the downhole tool.

13 Claims, 3 Drawing Sheets

(56) References Cited

U.S. PATENT DOCUMENTS

2012/0176138 A1\* 7/2012 Prammer .............. E21B 17/003
                                                                      324/338
2012/0264000 A1   10/2012   Chen et al.
2013/0002023 A1   1/2013   Liu et al.

\* cited by examiner

HYBRID BATTERY FOR HIGH TEMPERATURE APPLICATIONS

CROSS REFERENCE TO RELATED APPLICATIONS

None.

BACKGROUND OF THE DISCLOSURE

1. Field of the Disclosure

The present disclosure is related to battery power for a downhole tool.

2. Background of the Art

Wells used for recovering geothermal energy, hydrocarbons, and water can extend thousands of feet into the ground. The well tools used to drill these wells often include components that require electrical power. Some of this electrical power may be supplied by onboard batteries. The batteries suitable for operation at typical wellbore temperatures, which can exceed 80 degrees Celsius, conventionally do not function at the lower temperatures found at the surface. Thus, onboard battery power is not available for performing testing of electrically powered well tools at the surface.

The present disclosure addresses the need for battery power at the surface to operate well tools that use electrical power.

SUMMARY OF THE DISCLOSURE

In aspects, the present disclosure provides an apparatus for supplying power at the surface and in a wellbore. The apparatus may include a downhole tool configured to be conveyed into the wellbore using a conveyance device; and a battery bank conveyed by the downhole tool. The battery bank may include a plurality of battery cells wherein at least two cells of the plurality of battery cells have substantially different power responses to a change in an ambient temperature at the downhole tool.

In aspects, the present disclosure provides a method for supplying power at the surface and in a wellbore. The method may include coupling a battery bank to a downhole tool, the battery bank including a plurality of battery cells, wherein at least two cells of the plurality of battery cells have substantially different power responses to a change in an ambient temperature at the downhole tool; conveying the downhole tool and the battery bank into the wellbore; and supplying power to the downhole tool using the battery bank while in the wellbore.

Examples of certain features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
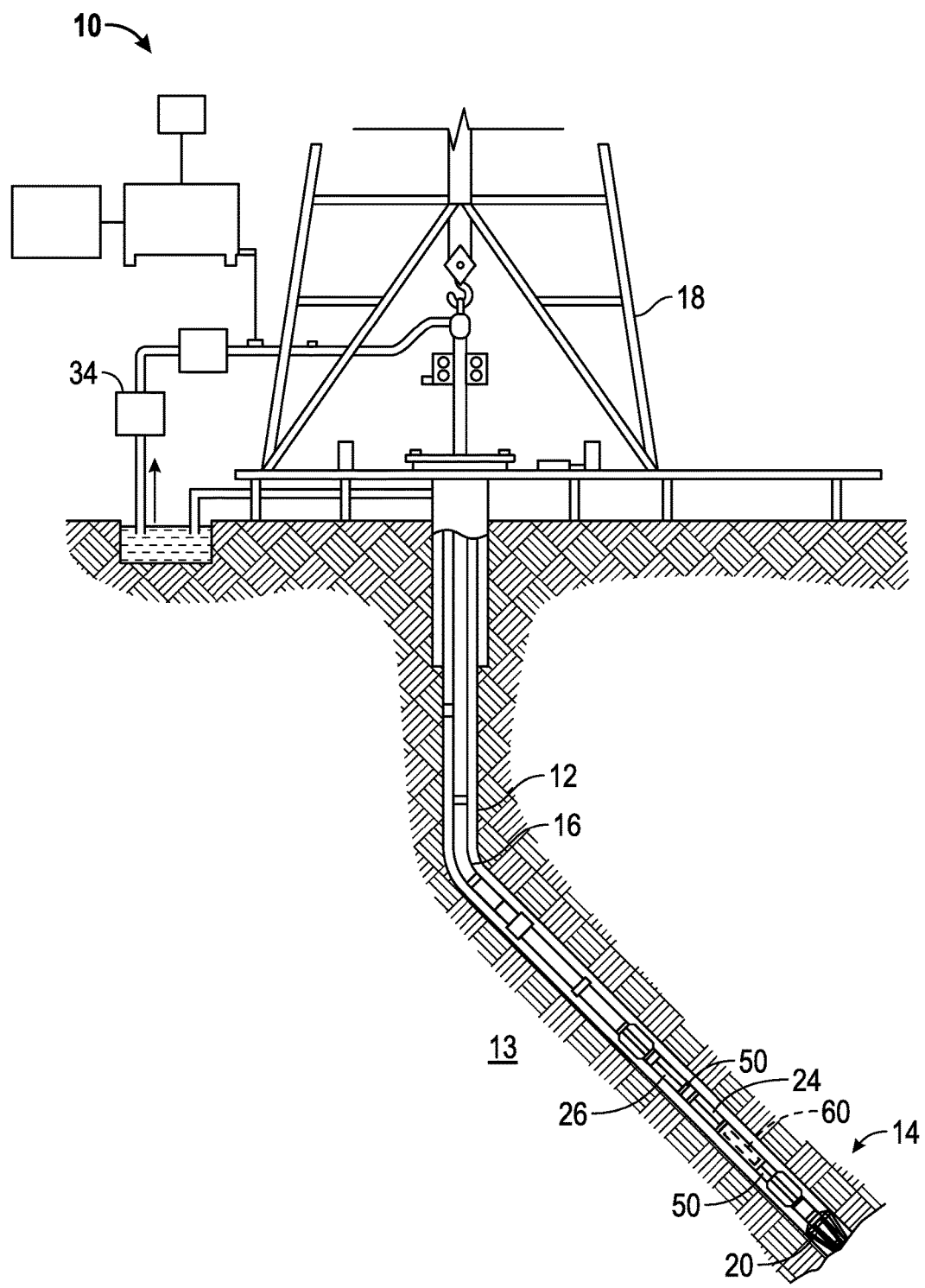
FIG. 1 is a schematic diagram of an exemplary drilling system for drilling a wellbore using an apparatus that can be operated according to the exemplary methods disclosed herein.

Referring now to FIG. 1, there is schematically illustrated a drilling system 10 for forming a wellbore 12 in an earthen formation 13. While a land-based rig is shown, these concepts and the methods are equally applicable to offshore drilling systems. Also, the wellbore 12 may include vertical sections, deviated sections, and horizontal sections, as well as branch wellbores. The drilling system 10 may use a bottomhole assembly (BHA) 14 conveyed by a rigid wellbore conveyance device such as a drill string 16 suspended from a rig 18. The drill string 16 may include a drill bit 20 at a distal end. The drill string 16 may include any known drilling tubular adapted for use in a wellbore, e.g., jointed drill pipe, coiled tubing, casing, liner, etc.

The BHA 14 can also contain various on-board tools, instruments, sensors, and devices that consume electrical energy. These devices will be collectively referred to as consumers 50. Illustrative, but not exclusive, consumers 50 include directional sensors and formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 13 surrounding the BHA 14. Other consumers 50 of electrical energy include sensors and communication devices 24 for controlling and/or determining one or more functions and properties of the BHA (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc. In embodiments of the present disclosure, a hybrid battery bank 60 may be used to energize the consumers 50.

Figure 2:
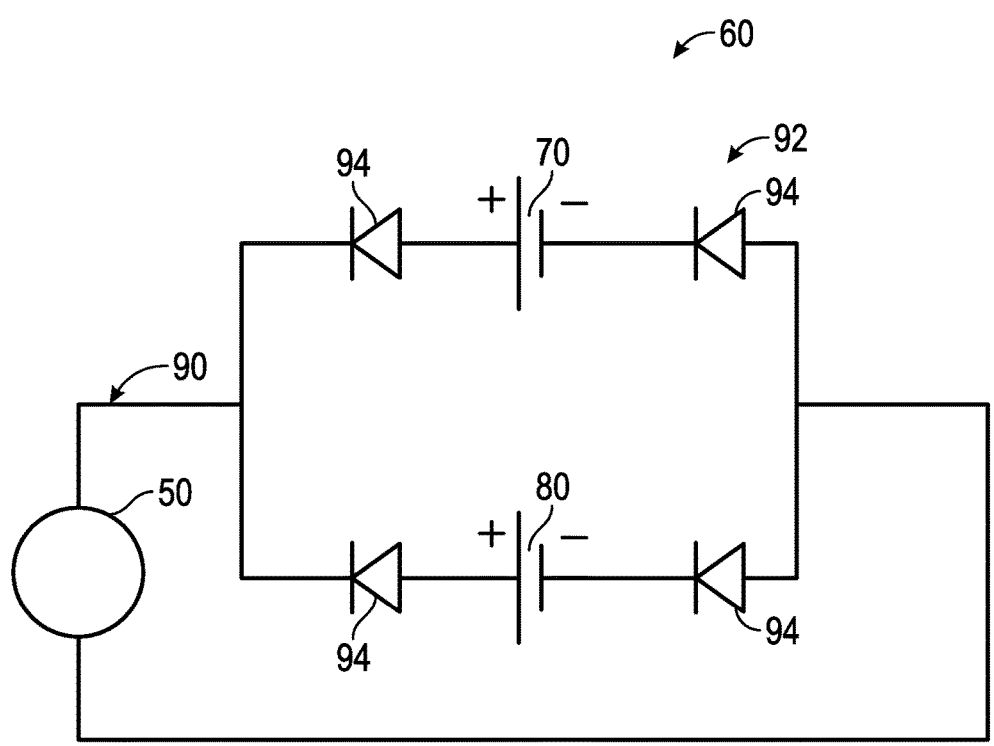
FIG. 2 shows an exemplary hybrid battery bank according to one embodiment of the present disclosure.

Referring now to FIG. 2, in one arrangement, the hybrid battery bank 60 includes a first battery bank 70 that includes batteries that may be used while the BHA 14 is in the wellbore 12 and subjected to high ambient wellbore temperature. The first battery bank 70 may include one cell or a plurality of cells. The first battery bank 70 uses a chemistry that delivers power to satisfy pre-determined demands at elevated temperatures. As used herein, the term "high" or "elevated" temperature refers to a temperature above 80 degrees Celsius and "high-temperature batteries" refer to batteries that are intended to operate at such temperatures. Illustrative, but not exclusive, high-temperature battery types include lithium cells, sodium-sulphur (NaS) cells, and sodium-nickel-chloride cells. Other high temperature batteries include batteries have liquid electrodes and ceramic solid-state electrolytes. In such arrangements, elevated temperatures are required to maintain the electrodes in a molten state and to achieve a sufficient ion-conductivity in the electrolyte.

The hybrid battery bank 60 also includes a second battery bank 80 that may be used while the BHA 14 is at the surface and subjected to ambient surface temperatures at the rig 18. The second battery bank 70 may include one cell or a plurality of cells. The second battery bank 80 uses a chemistry that delivers power to satisfy pre-determined demands at ambient temperatures at the surface. For purposes of the present disclosure, ambient temperatures at the surface include temperature that range from below freezing to 40 degrees Celsius and ambient surface batteries are batteries that operate at such temperatures. Illustrative, but not exclusive, ambient surface temperature battery types include alkaline batteries such as Mn/Zn cells, NiMH cells, Ni/Zn cells, etc. In some embodiments, the chemistry for the second battery bank 80 is selected to disable power delivery at elevated temperatures, but does not create a risk of fire or explosion in such situations. In embodiments, the chemistry is also selected to allow resumption of power deliver after temperatures have returned to ambient surface temperatures.

Thus, the hybrid battery pack 60 may be considered a battery power source having at least two battery cells that have substantially different power responses to a change in an ambient temperature at the downhole tool. The power response is a variance in the ability to deliver electrical power. For example, the first battery pack 70 has a power response of increasing supplied power as temperature increases, and the second battery pack 80 has a power response of decreasing supplied power as temperature increases. Moreover, a predetermined temperature may be used to segregate the operational states of the battery packs 70, 80. With respect to the battery packs 70, 80, an operational state relates to the ability to supply power. That is, below a predetermined temperature only a subset of battery cells of the plurality of battery cells supplies power. Likewise, above a predetermined temperature, only a subset of battery cells of the plurality of battery cells supplies power. The transition between an operation and non-operation state may be gradual or relatively quick.

Figure 3:
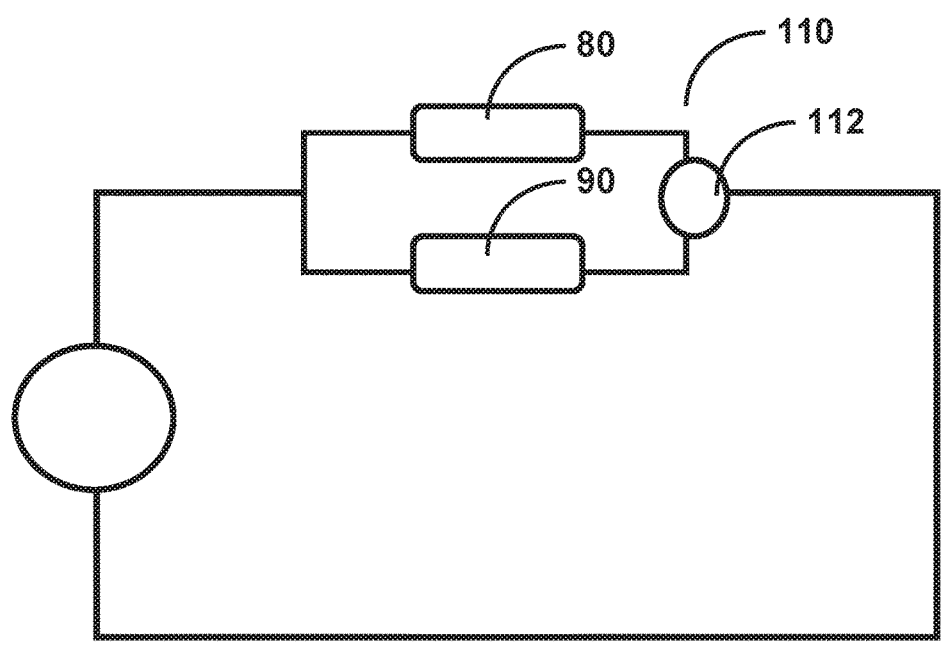
FIG. 3 shows an exemplary dynamic isolator according to one embodiment of the present disclosure.

The hybrid battery bank 60 may include a circuit 90 that decouples the first battery bank 70 from the second battery bank 80. As noted previously, depending on the prevailing temperature, only one of the two battery banks 70, 80 may be functional. Therefore, to prevent a short circuit, the circuit 90 may include an isolator 92 to decouple either battery bank 70, 80 if one becomes non-operational. The isolator 92 may be a static or dynamic component. For example, a static isolator 92 may include isolation elements 94, which may be diodes, to electrically isolate the first battery bank 70 from the second battery bank 80. A dynamic isolator (not shown) may include a switch that can be manually actuated to isolate the second battery bank 80 from the circuit 90. Referring to FIG. 3, another dynamic isolator 110 may include a switch 112 responsive to an ambient condition such as temperature. The switch 112 can selectively isolate either of the battery banks 70, 80 depending on the ambient temperature.

In another embodiment, the first battery bank 70 includes a fuel cell bank (not shown) that may be used while the BHA 14 is in the wellbore and the second battery bank 80 that may be used while the BHA 14 is at the surface and subjected to ambient surface. In a fuel cell electrical energy is created by a catalytic oxidation of hydrogen. The chemical reaction can be seen as a reverse reaction to the electrolytic decomposition of water.

Referring now to FIGS. 1 and 2, in one method of use, one or more consumers 50 of electrical energy are electrically connected to the hybrid battery bank 60 at the surface. While at the surface, the first battery bank 70 cannot function to supply electrical power and is decoupled from the circuit 90 due to the isolator 92. Therefore, only the second battery bank 80 supplies power to the consumers 50. This electrical power may be used to operate the consumers 50 when the first battery bank 70 is not operational. As noted previously, the first battery 70 may be in a non-operational state and unable to supply power due to relatively low ambient temperatures, which may occur at the surface or in the wellbore 12 (e.g., at shallow sections of the wellbore 12). For example, the second battery bank 80 may be used to perform diagnostics, tests, calibration, and other activities at the floor of the rig 18 on MWD equipment, formation evaluation tools, sensors, etc. After such activities are completed, the drill string 16 may be conveyed into the wellbore 12. The second battery bank 80 can continue to supply power to the consumers 50 while the BHA 14 is being conveyed along the wellbore 12 until ambient temperatures reach a level that render the second batter bank 80 non-operational. At that time, the isolator 92 decouples the second battery bank 80 from the circuit 90. Once the temperature is sufficiently high, the first battery bank 70 becomes operational and available to supply power to the consumers 50. During extraction of the drill string 16 from the wellbore 12, the first battery bank 70 becomes non-operational and the second battery bank 80 reverts to an operational state and supplies power, if still in an operational mode. That is, in some embodiments, the second battery bank 80 may be rendered permanently non-functional due to the high ambient downhole temperatures.

It should be understood that the hybrid battery bank 60 may be subject to numerous variants. For example, the first battery bank 70 and the second battery bank 80 may have overlapping operational ranges such that both are available to supply power. Also, the second battery bank 80 may be a single-use component that does not revert to an operational state after being non-operational.

It should be understood that the present disclosure was discussed in the context of a drilling system for a hydrocarbon producing well merely for brevity. Batteries according to the present disclosure may also be used on tools carried by wireline, slickline, e-lines, or other non-rigid carriers. Thus, non-rigid carriers and rigid carriers, such as the drill string 16, are merely representative of the conveyance devices that may be used to convey tools powered by batteries according to the present disclosure. Also, these tools may be used in conjunction with wells constructed for recovering geothermal energy, minerals, water, etc.

While the foregoing disclosure is directed to the one mode embodiments of the disclosure, various modifications will be apparent to those skilled in the art. It is intended that all variations within the scope of the appended claims be embraced by the foregoing disclosure.

I claim:

1. An apparatus for supplying power at the surface and in a wellbore, comprising:
   a downhole tool configured to be conveyed into the wellbore using a conveyance device;
   a battery bank conveyed by the downhole tool, the battery bank including a plurality of battery cells, wherein at least two cells of the plurality of battery cells have substantially different power responses to a change in an ambient temperature at the downhole tool; and a circuit configured to supply power from only a subset of battery cells of the plurality of battery cells below a predetermined temperature and wherein the subset of battery cells of the plurality of battery cells does not revert to an operational state after being non-operational above the predetermined temperature.

2. The apparatus of claim 1, wherein at least one of the plurality of battery cells is a fuel cell.

3. The apparatus of claim 1, wherein each battery cell of the plurality of battery cells is conveyed by the downhole tool, and wherein the power response of at least one cell of the plurality of cells is a decrease in supplied power as temperature increases.

4. The apparatus of claim 1, wherein a first battery cell of the plurality of battery cells increases supplied power as temperature increases, and a second battery cell of the plurality of battery cells decreases supplied power as temperature increases, and wherein the first and the second battery cells are conveyed by the downhole tool.

5. The apparatus of claim 1, wherein the at least two of the plurality of battery cells are electrically decoupled from one another.

6. A method for supplying power at the surface and in a wellbore, comprising:
 coupling a battery bank to a downhole tool, the battery bank including a plurality of battery cells, wherein at least two cells of the plurality of battery cells have substantially different power responses to a change in an ambient temperature at the downhole tool;
 supplying power to the downhole tool using the battery bank while at a rig floor using only a first subset of battery cells of the plurality of battery cells;
 conveying the downhole tool and the battery bank into the wellbore;
 supplying power to the downhole tool using the battery bank while in the wellbore, wherein only a second subset of battery cells of the plurality of battery cells supplies power above a predetermined temperature, wherein the first subset of battery cells does not revert to an operational state after being non-operational above the predetermined temperature, and wherein an isolator isolates the second subset of battery cells when below the predetermined temperature; and
 controlling the isolator using a switch that is responsive to an ambient temperature.

7. The method of claim 6, wherein at least one of the plurality of battery cells is a fuel cell.

8. The method of claim 6, each battery cell of the plurality of battery cells is conveyed by the downhole tool, and wherein the power response of at least one cell of the plurality of cells is a decrease in supplied power as temperature increases.

9. The method of claim 6, wherein a first battery cell of the plurality of battery cells increases supplied power as temperature increases, and a second battery cell of the plurality of battery cells decreases supplied power as temperature increases, and wherein the first and the second battery cells are conveyed by the downhole tool.

10. The method of claim 6, further comprising decoupling at least two of the plurality of battery cells from one another.

11. The method of claim 6, wherein a first battery cell of the plurality of battery cells increases supplied power as temperature increases, and a second battery cell of the plurality of battery cells decreases supplied power as temperature increases, and further comprising:
 conveying the first and the second battery cell using the downhole tool along the wellbore; and
 supplying power to the downhole tool while the downhole tool is in the wellbore using only the second battery cell when an ambient temperature in the wellbore is above the predetermined temperature.

12. An apparatus for supplying power at the surface and in a wellbore, comprising:
 a downhole tool configured to be conveyed into the wellbore using a conveyance device;
 a battery bank conveyed by the downhole tool, the battery bank including a plurality of battery cells, the plurality of battery cells include a first battery cell supplying increasing supplied power as a temperature ambient to the downhole tool increases and a second battery cell supplying decreasing power as the temperature ambient to the downhole tool increases;
 a circuit configured to supply power to the downhole tool from only the first battery cell after the temperature ambient to the downhole tool is above a predetermined temperature, wherein the second batter cell does not revert to an operational state after becoming non-operational above the predetermined temperature; and
 a dynamic isolator that includes a switch selectively isolating the subset of battery cells, wherein the switch is responsive to an ambient temperature.

13. The apparatus of claim 12, wherein the isolator is configured to decouple the second battery cell from the downhole tool after the second battery cell is non-functional.

* * * * *

UNITED STATES PATENT AND TRADEMARK OFFICE
CERTIFICATE OF CORRECTION

PATENT NO. : 10,145,210 B2
APPLICATION NO. : 13/921781
DATED : December 4, 2018
INVENTOR(S) : Thomas Kruspe It is certified that error appears in the above-identified patent and that said Letters Patent is hereby corrected as shown below:

In the Claims

At Column 4, Line 64, please delete: "wherein the subset" and insert --wherein a subset--

At Column 6, Line 40, please delete: "isolating the subset of" and insert --isolating the first--

Signed and Sealed this
Seventh Day of May, 2019

Andrei Iancu
*Director of the United States Patent and Trademark Office*